United States Patent
Vinokur (10) Patent No.: US 10,154,680 B2
(45) Date of Patent: Dec. 18, 2018

(54) LUBRICANT AND BINDING AGENT FOR THE PRODUCTION OF FEEDSTUFF AND THE LIKE AND SYSTEM AND METHOD FOR USE OF SAME

(71) Applicant: Aron Vinokur, Dallas, TX (US)

(72) Inventor: Aron Vinokur, Dallas, TX (US)

( * ) Notice: Subject to any disclaimer, the term of this patent is extended or adjusted under 35 U.S.C. 154(b) by 37 days.

(21) Appl. No.: 15/608,181

(22) Filed: May 30, 2017

(65) Prior Publication Data

US 2017/0339982 A1 Nov. 30, 2017

Related U.S. Application Data

(60) Provisional application No. 62/342,946, filed on May 29, 2016.

(51) Int. Cl.
| | |
|---|---|
| A23K 40/00 | (2016.01) |
| A23K 40/10 | (2016.01) |
| A23K 40/20 | (2016.01) |
| A23K 10/30 | (2016.01) |
| A23K 50/80 | (2016.01) |
| C10M 105/14 | (2006.01) |
| C10M 173/02 | (2006.01) |
| C10L 5/44 | (2006.01) |
| A23K 20/111 | (2016.01) |
| A23K 20/163 | (2016.01) |
| A23K 20/10 | (2016.01) |

(52) U.S. Cl.
CPC ............ *A23K 50/80* (2016.05); *A23K 10/30* (2016.05); *A23K 20/10* (2016.05); *A23K 20/111* (2016.05); *A23K 20/163* (2016.05); *A23K 40/00* (2016.05); *A23K 40/10* (2016.05); *A23K 40/20* (2016.05); *C10L 5/44* (2013.01); *C10M 105/14* (2013.01); *C10M 173/02* (2013.01); *C10M 2207/023* (2013.01); *C10M 2207/0225* (2013.01); *C10M 2207/121* (2013.01); *C10M 2207/123* (2013.01); *C10M 2209/126* (2013.01); *C10N 2230/62* (2013.01)

(58) Field of Classification Search
None
See application file for complete search history.

(56) References Cited

U.S. PATENT DOCUMENTS

| | | |
|---|---|---|
| 3,532,507 A | 10/1970 | Cascione |
| 3,862,336 A | 1/1975 | Kofsky et al. |
| 4,542,031 A | 9/1985 | Nakajima et al. |

(Continued)

OTHER PUBLICATIONS

International Searching Authority, International Search Report, dated Aug. 23, 2017, PCT/US17/35035.

*Primary Examiner* — Mary Lynn F Theisen
(74) *Attorney, Agent, or Firm* — Scott T. Griggs; Griggs Bergen LLP (57) ABSTRACT

A lubricant and binding agent for the production of feedstuff and the like and a system and method for use of the same are disclosed. In one embodiment of the method, an organic-based ingredient and a lubricant and binding agent are combined and subjected to a pellet-mill production process. The lubricant and binding agent includes about 15% to about 40% by weight of glycerin, about 0.005% to about 0.017% by weight of guar gum, about 0.009% to about 0.028% by weight of gum arabic, about 0.005% to about 0.017% by weight of aloe vera, and a balance by weight of water. The lubricant and binding agent increases production efficiency and pellet durability.

20 Claims, 1 Drawing Sheet

(56) References Cited

U.S. PATENT DOCUMENTS

| | | | |
|---|---|---|---|
| 5,100,464 A | 3/1992 | Kelly et al. |
| 5,211,980 A | 5/1993 | Cox |
| 5,236,717 A | 8/1993 | Vinci |
| 5,250,307 A | 10/1993 | Cummings et al. |
| 5,688,930 A | 11/1997 | Berth et al. |
| 6,022,566 A | 2/2000 | Miller |
| 6,113,974 A | 9/2000 | Winowiski et al. |
| 2005/0214438 A1 | 9/2005 | McCormick |
| 2006/0045957 A1 | 3/2006 | Bevans et al. |
| 2009/0011089 A1 | 1/2009 | Brinker |
| 2009/0047355 A1 | 2/2009 | Audweter et al. |
| 2013/0022562 A1 | 1/2013 | Maunsell et al. |
| 2013/0312669 A1 | 11/2013 | Steffen |
| 2015/0030752 A1 | 1/2015 | Omernik et al. |

US 10,154,680 B2

LUBRICANT AND BINDING AGENT FOR THE PRODUCTION OF FEEDSTUFF AND THE LIKE AND SYSTEM AND METHOD FOR USE OF SAME

PRIORITY STATEMENT

This application claims priority from U.S. Patent Application Ser. No. 62/342,946 entitled "Binding Agent for the Production of Feedstuff and the Like and System and Method for Use of Same," and filed on May 29, 2016 in the name of Aron Vinokur; which is hereby incorporated by reference for all purposes.

TECHNICAL FIELD OF THE INVENTION

This invention relates, in general, to a process for the production of feedstuff and the like and, in particular, to a lubricant and binding agent for the production of feedstuff and the like and a system and method for use of the same.

BACKGROUND OF THE INVENTION

Without limiting the scope of the present invention, the background is described with reference to the production of feedstuffs, as an example. Feedstuffs in pellet or granular form have been produced in a number of ways. One common process is to steam the mix of ingredients such as grains, grasses, minerals and vitamins, and then to introduce such materials into a pellet-mill to be pressed and kneaded as they pass between rollers and to be extruded from a pellet-die to produce the desired size of pellet. For ease of production and to produce the desired size, a lubricant and binder may be added. Too often, even with the use of existing lubricants and binders, a considerable part of the produced pellets are powder-like, thereby causing waste. Additionally, as the feed is stored and transported pellets fall apart and thus more waste is created. Improvements in lubricants and binders are therefore needed.

SUMMARY OF THE INVENTION

It would be advantageous to provide improved pellets that are less powder like during production and after production. It would also be desirable to enable a chemical-based solution for a lubricant and binding agent in the production of feedstuffs and the like that is organic and decreases the load on the mixing vessels used in the production of feedstuff. To better address one or more of these concerns, a lubricant and binding agent for the production of feedstuff and the like and a system and method for use of the same are disclosed. In one embodiment of the method, an organic-based ingredient and a lubricant and binding agent are combined and subjected to a pellet-mill production process. The lubricant and binding agent may include about 15% to about 40% by weight of glycerin, about 0.005% to about 0.017% by weight of guar gum, about 0.009% to about 0.028% by weight of gum arabic, about 0.005% to about 0.0017% by weight of aloe vera, and a balance by weight of water. The lubricant and binding agent increases production efficiency and pellet durability. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
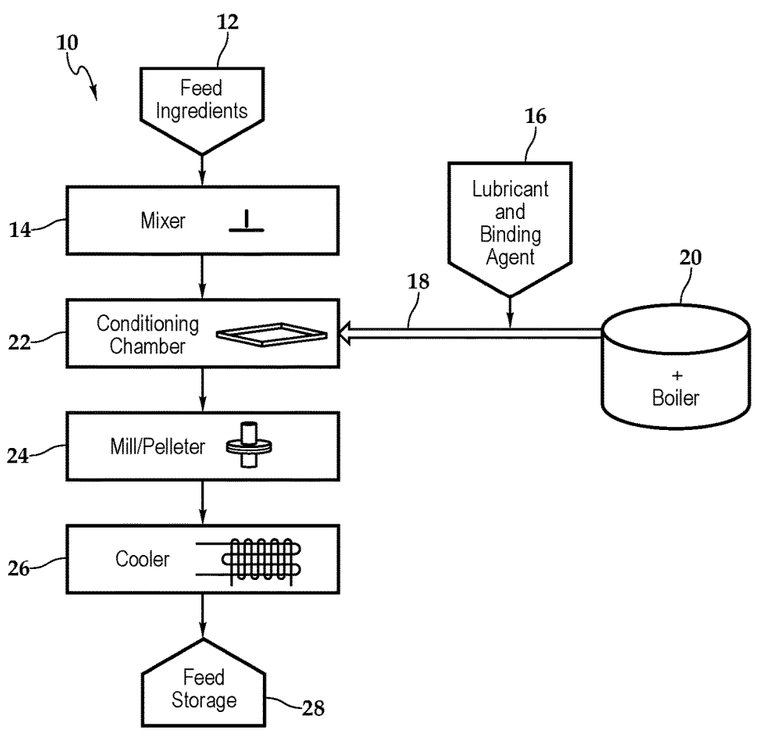
FIG. 1 is a flow diagram depicting one embodiment of a lubricant and binding agent being utilized for the production of feedstuff and the like according to the teachings presented herein.

Referring initially to FIG. 1, therein is depicted one embodiment of a system for the production of feedstuff and the like, which is generally designated 10. Feed ingredients 12, with or without water as a carrier, are provided to a mixer 14, which provides agitation. In one implementation, a lubricant and binding agent 16 is injected into a line 18 carrying steam provided by a boiler 20. At a conditioning chamber 22, the mixed feed ingredients and the steam-carried lubricant and binding agent are combined and atomized, allowing various starches, fibers, and other compounds within the feed ingredients 12 to breakdown. This process is improved by the lubricant and binding agent 16, which allows the feed ingredients 12 to accept higher temperatures, from about 180° F. to about 220° F. Higher temperatures also kill over 99% of the pathogens and unwanted constituent components of the ingredients, such as weed seed.

The various batching, mixing and pelleting steps represented by the conditioning chamber 22, a mill/pelleter 24, and a cooler 26 may be carried out in known commercial equipment currently used in the conventional pelleting processes, including steam-based processes. This equipment may be combined in an installation comprising of, for example, and without limitation, a mixer which discharges into a surge bin, which in turn discharges into a pellet mill consisting of a variable-speed feeder, a steam conditioning chamber, and a die/roller assembly. Mash may flow from the feeder through the conditioner, which discharges into the die/roller assembly where the mash is extruded to form pellets.

In the illustrated implementation, following the conditioning chamber 22, at the mill/pelleter 24, prior to the drying and cooling at the cooler 26, the pellets may be further shaped and, in addition, screened to remove the fine or small particles that may have been the result of previous cutting at the die or that were generated in previous handling. At a cooler 26, a drying and cooling step occurs with conventional commercial equipment such as a horizontal belt cooler in which the pellets or other form of product are conveyed onto a moving belt through which air is drawn to cool and dry them. Following the cooler 26, the product is ready and provided to feed storage 28. It should be appreciated that although a particular architecture and design of manufacturing equipment is illustrated and described in FIG. 1, other architectures and designs of manufacturing equipment are within the teachings presented herein.

As depicted in FIG. 1, the system 10 includes pellet-mill production equipment configured to receive an organic-based ingredient and a lubricant and binding agent to produce the organic-based pellet. In one embodiment, the lubricant and binding agent may include about 15% to about 40% by weight of glycerin, about 0.005% to about 0.017% by weight of guar gum, about 0.009% to about 0.028% by weight of gum arabic, about 0.005% to about 0.017% by weight of aloe vera, and a balance by weight of water. In one implementation, the lubricant and binding agent may also include about 0.06% to about 0.18% by weight of potassium sorbate, about 0.55% to about 2% by weight of ascorbic acid, about 0.055% to about 0.2% by weight of citric acid, and/or about 0.0055% to about 0.018% by weight of tocopherol, for example. In one implementation, the organic-based ingredient may be an ingredient such as animal feed stock, feed, fish food, wood, wood charcoal, fertilizer, construction material, or constituent ingredient thereof, for example.

The present invention will now be illustrated by reference to the following non-limiting working examples wherein procedures and materials are solely representative of those which can be employed, and are not exhaustive of those available and operative. Tables I-V and Examples I-XXVII illustrate general and specific examples of utilizing a reactive grade of the lubricant and binding agent to not only act as a lubricant and binder, but to increase efficiency and pellet durability as well. The following glossary enumerates the components utilized in the Tables and Examples presented hereinbelow.

ALOE VERA is an extract from a succulent plant species of the genus Aloe.

ASCORBIC ACID is an oxidation-reduction catalyst; vitamin C.

CASTOR OIL is a pale-yellowish or almost colorless, transparent, viscous liquid derived from the seeds of the castor bean.

CITRIC ACID is 2-hydroxy-1,2,3-propanetricarboxylic acid.

GLYCERIN is 1,2,3-propanetriol, a clear, colorless syrupy liquid.

GUAR GUM is a water-soluble plant mucilage obtained from the ground endosperms of *Cyanopsis tetragonloba*.

GUM ARABIC is the dried, water-soluble exudate from the stems of Acacia senegal or related species.

POTASSIUM SORBATE is potassium-2,4-hexadienoate.

SWEETENER is a food additive, either natural or synthetic, usually having much greater sweetness intensity than sucrose, but without the caloric value.

TOCOPHEROL is a viscous oil that is any of a group of related substances that constitute vitamin E.

WATER is $H_2O$.

An organic-based pellet may be prepared with a lubricant and binding agent having a composition as defined in the ranges provided in Table I.

TABLE I

Composition of Lubricant and Binding Agent

| | Some Embodiments of Preferred Ranges*. Percent of Total by Weight |
|---|---|
| Guar Gum | 0.005%-0.017% |
| Gum Arabic | 0.009%-0.028% |
| Glycerin | 15%-40% |
| Aloe Vera | 0.005%-0.017% |
| Potassium Sorbate | 0.06%-0.18% |
| Ascorbic Acid | 0.55%-2% |
| Citric Acid | 0.055%-.2% |
| Tocopherol | 0.0055%-0.018% |
| Water | Adjusted to above % |

*Please note that all ranges in Table I are expressed as "about." By way of example, with respect to guar gum, the range is about 0.005% to about 0.017%. By way of a second example, with respect to gum arabic, the range is about 0.009% to about 0.028%.

An organic-based pellet may be prepared with a lubricant and binding agent having a composition as defined in the ranges provided in Table II.

TABLE II

Composition of Lubricant and Binding Agent

| | Some Embodiments of More Preferred Ranges*. Percent of Total by Weight |
|---|---|
| Guar Gum | 0.007%-0.015% |
| Gum Arabic | 0.011%-0.021% |
| Glycerin | 20%-37% |
| Aloe Vera | 0.007%-0.015% |
| Potassium Sorbate | 0.07%-0.16% |
| Ascorbic Acid | 0.7%-1.5% |
| Citric Acid | 0.07%-0.15% |
| Tocopherol | 0.007%-0.016% |
| Water | Adjusted to above % |

*Please note that all ranges in Table II are expressed as "about." By way of example, with respect to guar gum, the range is about 0.007% to about 0.015%. By way of a second example, with respect to gum arabic, the range is about 0.011% to about 0.021%.

An organic-based pellet may be prepared with a lubricant and binding agent having a composition as defined in the ranges provided in Table III.

TABLE III

Composition of Lubricant and Binding Agent

| | Some Embodiments of Most Preferred Ranges*. Percent of Total by Weight |
|---|---|
| Guar Gum | 0.008%-0.0125% |
| Gum Arabic | 0.015%-.020% |
| Glycerin | 22%-35% |
| Aloe Vera | 0.008%-0.0125% |
| Potassium Sorbate | 0.08%-0.12% |
| Ascorbic Acid | 0.75%-1.3% |
| Citric Acid | 0.075%-0.13% |
| Tocopherol | 0.008%-0.012% |
| Water | Adjusted to above % |

*Please note that all ranges in Table III are expressed as "about." By way of example, with respect to guar gum, the range is about 0.008% to about 0.0125%. By way of a second example, with respect to gum arabic, the range is about 0.015% to about 0.020%.

An organic-based pellet, such as feed, fish food, or wood, may be prepared with a lubricant and binding agent having a composition as defined in the ranges provided in Table IV.

TABLE IV

Composition of Lubricant and Binding Agent

| | Percent of Total by Weight* | | |
|---|---|---|---|
| | Feed | Fish Food | Wood |
| Glycerin | 15%-50% | 15%-50% | 15%-50% |

TABLE IV-continued

Composition of Lubricant and Binding Agent

| | Percent of Total by Weight* | | |
|---|---|---|---|
| | Feed | Fish Food | Wood |
| Glycerin | 0%-25% | 0%-25% | 0%-20% |
| Sweetener | 0%-5% | 0%-5% | 0%-5% |
| Guar Gum | 0.010%-0.050% | 0.010%-0.050% | 0.010%-0.050% |
| Gum Arabic | 0.010%-0.050% | 0.010%-0.050% | 0.010%-0.050% |
| Aloe Vera | 0.010%-0.050% | 0.010%-0.050% | 0.010%-0.050% |
| Castor | 0.000%-0.000% | 0.000%-0.000% | 0.000%-5.000% |
| Water | 19.850%-84.970% | 19.850%-84.970 | 19.850%-84.970 |

*Please note that all ranges in Table IV are expressed as "about." By way of example, with respect to guar gum and feed, the range is about 0.010% to about 0.050%. By way of a second example, with respect to gum arabic and feed, the range is about 0.010% to about 0.050%.

An organic-based pellet, such as wood charcoal, food, fertilizer, or construction material, may be prepared with a lubricant and binding agent having a composition as defined in the ranges provided in Table V.

TABLE V

Composition of Lubricant and Binding Agent

| | Percent of Total by Weight* | | | Construction (Concrete with Limestone Flour) |
|---|---|---|---|---|
| | Wood Charcoal | Food | Fertilizer | |
| Glycerin | 15%-50% | 5%-50% | 5%-50% | 15%-50% |
| Glycerin | 0%-15% | 0%-25% | 0%-20% | 0%-20% |
| Sweetener | 0%-5% | 0%-5% | 0%-5% | 0%-20% |
| Guar Gum | 0.010%-0.050% | 0.010%-0.050% | 0.010%-0.050% | 0.010%-0.050% |
| Gum Arabic | 0.010%-0.050% | 0.010%-0.050% | 0.010%-0.050% | 0.010%-0.050% |
| Aloe Vera | 0.010%-0.050% | 0.010%-0.050% | 0.010%-0.050% | 0.010%-0.050% |
| Castor | 0.000%-10.000% | 0.000%-0.000% | 0.000%-0.000% | 0.000%-0.000% |
| Water | 19.850%-84.970% | 19.850-94.970% | 24.850%-94.970% | 24.850%-84.970% |

*Please note that all ranges in Table V are expressed as "about." By way of example, with respect to guar gum and wood charcoal, the range is about 0.010% to about 0.050%. By way of a second example, with respect to gum arabic and wood charcoal, the range is about 0.010% to about 0.050%.

EXAMPLE I

A granular feedstuff was prepared with an organic-based ingredient and a lubricant and binding agent that was prepared according to the following formulation for Preparation 1:

| | Percent of Total by Weight |
|---|---|
| Glycerin | 25.000% |
| Glycerin | 0.000% |
| sweetener | 2.500% |
| Guar Gum | 0.025% |
| Gum Arabic | 0.025% |
| Aloe Vera | 0.020% |
| Castor Oil | 0.000% |
| Water | 72.43000% |

The components of Preparation 1 were mixed together and sufficiently heated to obtain a fluid. The resulting lubricant and binding agent was utilized in a pellet-mill production, steam-based process of the type described in FIG. 1.

EXAMPLE II

A granular fish food was prepared with an organic-based ingredient and a lubricant and binding agent that was prepared according to the following formulation for Preparation 2:

| | Percent of Total by Weight |
|---|---|
| Glycerin | 25.000% |
| Glycerin | 0.000% |
| sweetener | 0.000% |
| Guar Gum | 0.020% |
| Gum Arabic | 0.020% |
| Aloe Vera | 0.010% |
| Castor Oil | 0.000% |
| Water | 74.95000% |

The components of Preparation 2 were mixed together and sufficiently heated to obtain a fluid. The resulting binding agent was utilized in a pellet-mill production, steam-based process of the type described in FIG. 1.

EXAMPLE III

A granular wood product was prepared with an organic-based ingredient and a lubricant and binding agent that was prepared according to the following formulation for Preparation 3:

| | Percent of Total by Weight |
|---|---|
| Glycerin | 25.000% |
| Glycerin | 0.000% |
| sweetener | 2.500% |
| Guar Gum | 0.025% |
| Gum Arabic | 0.025% |
| Aloe Vera | 0.020% |
| Castor Oil | 5.000% |
| Water | 67.43000% |

The components of Preparation 3 were mixed together and sufficiently heated to obtain a fluid. The resulting binding agent was utilized in a pellet-mill production, steam-based process of the type described in FIG. 1.

EXAMPLE IV

A granular wood charcoal product was prepared with an organic-based ingredient and a lubricant and binding agent that was prepared according to the following formulation for Preparation 4:

|  | Percent of Total by Weight |
| --- | --- |
| Glycerin | 25.000% |
| Glycerin | 0.000% |
| Sweetener | 0.000% |
| Guar Gum | 0.025% |
| Gum Arabic | 0.025% |
| *Aloe Vera* | 0.020% |
| Castor Oil | 10.000% |
| Water | 64.93000% |

The components of Preparation 4 were mixed together and sufficiently heated to obtain a fluid. The resulting binding agent was utilized in a pellet-mill production, steam-based process of the type described in FIG. 1.

EXAMPLE V

A granular food product was prepared with an organic-based ingredient and a lubricant and binding agent that was prepared according to the following formulation for Preparation 5:

|  | Percent of Total by Weight |
| --- | --- |
| Glycerin | 25.000% |
| Glycerin | 0.000% |
| sweetener | 1.000% |
| Guar Gum | 0.025% |
| Gum Arabic | 0.025% |
| *Aloe Vera* | 0.020% |
| Castor Oil | 0.000% |
| Water | 73.93000% |

The components of Preparation 5 were mixed together and sufficiently heated to obtain a fluid. The resulting binding agent was utilized in a pellet-mill production, steam-based process of the type described in FIG. 1.

EXAMPLE VI

A granular fertilizer product was prepared with an organic-based ingredient and a lubricant and binding agent that was prepared according to the following formulation for Preparation 6:

|  | Percent of Total by Weight |
| --- | --- |
| Glycerin | 25.000% |
| Glycerin | 0.000% |
| Sweetener | 0.000% |
| Guar Gum | 0.025% |
| Gum Arabic | 0.025% |
| *Aloe Vera* | 0.020% |
| Castor Oil | 0.000% |
| Water | 74.93000% |

The components of Preparation 6 were mixed together and sufficiently heated to obtain a fluid. The resulting binding agent was utilized in a pellet-mill production, steam-based process of the type described in FIG. 1.

EXAMPLE VII

A granular construction product was prepared with an organic-based ingredient and a lubricant and binding agent that was prepared according to the following formulation for Preparation 7:

|  | Percent of Total by Weight |
| --- | --- |
| Glycerin | 25.000% |
| Glycerin | 0.000% |
| Sweetener | 0.000% |
| Guar Gum | 0.025% |
| Gum Arabic | 0.025% |
| *Aloe Vera* | 0.020% |
| Castor Oil | 0.000% |
| Water | 74.93000% |

The components of Preparation 7 were mixed together and sufficiently heated to obtain a fluid. The resulting binding agent was utilized in a pellet-mill production, steam-based process of the type described in FIG. 1.

With respect to Examples I through VII and corresponding Preparations 1 through 7, in use, the lubricant and binding agent saves 15% to 50% on electricity depending on the mill type. Additionally, the lubricant and binding agent increases the temperature by at least 20 degrees Fahrenheit, which helps breakdown starches into sugars quicker and kill any bacteria present. The mill, also, may be optimized to produce 15% to 40% more tonnage due to the lubricant properties of the lubricant and binding agent. Additionally, the use of the binding agent keeps "fines" to a minimum, which is a tremendous savings.

As a result, mill parts may last easily 20% to 30% longer. This saves significant money. Additionally the product produced by the systems and methods presented herein using the lubricant and binding agent is a pellet which is much stronger.

EXAMPLE VIII

A pellet fertilizer product was prepared with an organic-based ingredient and a lubricant and binding agent that was prepared according to the following formulation for Preparation 8:

|  | Percent of Total Solution |
| --- | --- |
| Guar Gum | 0.009% |
| Gum Arabic | 0.018% |
| Glycerin | 28% |
| *Aloe Vera* | 0.009% |
| Potassium Sorbate | 0.1% |
| Ascorbic Acid | 1% |
| Citric Acid | 0.1% |
| Tocopherol | 0.01% |
| Water | 70.754% |

The components of Preparation 8 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a pellet fertilizer product, Preparation 8 showed notable results when compared to a conventional, prior art preparation. The production rate increased at the facility from 4 tons/hour to 5.5 tons/hour with a higher operating temperature in the chamber, which increased from 202° F. (94.4° C.) to 227° F. (108.3° C.). Additionally, the operational amperage decreased from 195 Amps to 163 Amps and the Pellet Durability Index (PDI) increased from 92 to 98. Further, lower decibels were experienced during production. These benefits resulted in an increased life of dyes and shells from 5,000 tons produced to over 6,200 tons produced.

EXAMPLE IX

A pellet fertilizer product was prepared with an organic-based ingredient and a lubricant and binding agent that was prepared according to the following formulation for Preparation 9:

|  | Percent of total solution |
| --- | --- |
| Guar Gum | 0.015% |
| Gum Arabic | 0.025% |
| Glycerin | 30% |
| Aloe Vera | 0.010% |
| Potassium Sorbate | 0.1% |
| Ascorbic Acid | 1% |
| Citric Acid | 0.1% |
| Tocopherol | 0.01% |
| Water | 68.74% |

The components of Preparation 9 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a pellet fertilizer product, Preparation 9 showed notable results when compared to a conventional, prior art preparation. The production rate increased at the facility from 1.3 tons/hour to 2.1 tons/hour with a higher operating temperature in the chamber, which increased from 205° F. (96.1° C.) to 220° F. (104.4° C.). Additionally, the operational amperage decreased from 160 Amps to 142 Amps and the Pellet Durability Index (PDI) increased from 75 to 82. These benefits resulted in an increased life of dyes and shells from 4,500 tons produced to over 6,200 tons produced.

EXAMPLE X

An animal feed flake product was prepared with an organic-based ingredient and a lubricant and binding agent that was prepared according to the following formulation for Preparation 10:

|  | Percent of total solution |
| --- | --- |
| Guar Gum | 0.010% |
| Gum Arabic | 0.020% |
| Glycerin | 35% |
| Aloe Vera | .010% |
| Potassium Sorbate | 0.1% |
| Ascorbic Acid | 1% |
| Citric Acid | 0.1% |
| Tocopherol | 0.01% |
| Water | 63.75% |

The components of Preparation 10 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 10 showed notable results when compared to a conventional, prior art preparation. The production rate increased at the facility from 6 tons/hour to 7.8 tons/hour with a higher operating temperature in the chamber, which increased from 183° F. (83.8° C.) to 212° F. (100° C.). Additionally, the operational amperage decreased from 137 Amps to 120 Amps. The life of the roll was increased from 6 months to 7.5 months with a 15% reduction in fines. Further, lower decibels were experienced during production. These benefits resulted in an increased life of dyes and shells from 5,000 tons produced to over 6,200 tons produced.

EXAMPLE XI

An animal feed flake product was prepared with an organic-based ingredient and a lubricant and binding agent that was prepared according to the following formulation for Preparation 11:

|  | Percent of total solution |
| --- | --- |
| Guar Gum | 0.009% |
| Gum Arabic | 0.018% |
| Glycerin | 28% |
| Aloe Vera | 0.009% |
| Potassium Sorbate | 0.1% |
| Ascorbic Acid | 1% |
| Citric Acid | 0.1% |
| Tocopherol | 0.01% |
| H2O | 70.754% |

The components of Preparation 11 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F.

(29.4° C.). The composition was mixed well till the consistency was a viscous liquid with no visible solid particles.

With respect to an animal feed flake product, Preparation 11 showed notable results when compared to a conventional, prior art preparation. The production rate increased at the facility from 8 tons/hour to 11 tons/hour with a higher operating temperature in the chamber, which increased from 195° F. (90.5° C.) to 215° F. (101.6° C.). Additionally, the operational amperage decreased from 185 Amps to 182 Amps. The life of the roll was increased from 8 months to 11 months with a 12% reduction in fines. Further, lower decibels were experienced during production.

EXAMPLE XII

An animal feed flake product was prepared with an organic-based ingredient and a lubricant and binding agent that was prepared according to the following formulation for Preparation 12:

|  | Percent of total solution |
|---|---|
| Guar Gum | 0.009% |
| Gum Arabic | 0.018% |
| Glycerin | 28% |
| Aloe Vera | 0.009% |
| Potassium Sorbate | 0.1% |
| Ascorbic Acid | 1% |
| Citric Acid | 0.1% |
| Tocopherol | 0.01% |
| Water | 70.754% |

The components of Preparation 12 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 12 showed notable results when compared to a conventional, prior art preparation. The production rate increased at the facility from 8 tons/hour to 10.7 tons/hour with a higher operating temperature in the chamber, which increased from 190° F. (87.7° C.) to 205° F. (96.1° C.). Additionally, the operational amperage decreased from 185 Amps to 181 Amps. The life of the roll was increased from 8 months to 11 months with a 12% reduction in fines. Further, lower decibels were experienced during production.

EXAMPLE XIII

An animal feed flake product was prepared with an organic-based ingredient and a lubricant and binding agent that was prepared according to the following formulation for Preparation 13:

|  | Percent of total solution |
|---|---|
| Guar Gum | 0.009% |
| Gum Arabic | 0.018% |
| Glycerin | 28% |
| Aloe Vera | 0.009% |
| Potassium Sorbate | 0.1% |
| Ascorbic Acid | 1% |
| Citric Acid | 0.1% |
| Tocopherol | 0.01% |
| H2O | 70.754% |

The components of Preparation 13 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 13 showed notable results when compared to a conventional, prior art preparation. The production rate increased at the facility from 7 tons/hour to 10.3 tons/hour with a higher operating temperature in the chamber, which increased from 160° F. (71.1° C.) to 180° F. (82.2° C.). Additionally, the operational amperage decreased from 185 Amps to 181 Amps. The life of the roll was increased by decreasing the roller operational pounds per square inch (PSI) from 350 PSI to 312 PSI, thereby increasing the roller life from 8 months to 11 months with a 17% reduction in fines. Further, lower decibels were experienced during production.

EXAMPLE XIV

An animal feed flake product was prepared with an organic-based ingredient and a lubricant and binding agent that was prepared according to the following formulation for Preparation 14:

|  | Percent of total solution |
|---|---|
| Guar Gum | 0.010% |
| Gum Arabic | 0.020% |
| Glycerin | 35% |
| Aloe Vera | 0.010% |
| Potassium Sorbate | 0.1% |
| Ascorbic Acid | 1% |
| Citric Acid | 0.1% |
| Tocopherol | 0.01% |
| Water | 63.75% |

The components of Preparation 14 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F.

(29.4° C.). The composition was mixed well till the consistency was a viscous liquid with no visible solid particles.

With respect to an animal feed flake product, Preparation 14 showed notable results when compared to a conventional, prior art preparation. The production rate increased at the facility from 6.25 tons/hour to 7.8 tons/hour with a higher operating temperature in the chamber, which increased from 190° F. (87.7° C.) to 205° F. (96.1° C.). Additionally, the operational amperage decreased from 194 Amps to 178 Amps. The life of the roll was increased by decreasing the roller operational pounds per square inch (PSI) from 370 PSI to 315 PSI, thereby increasing the roller life from 8 months to 11 months with a 20% reduction in fines. Further, lower decibels were experienced during production.

EXAMPLE XV

An animal feed flake product was prepared with an organic-based ingredient and a lubricant and binding agent that was prepared according to the following formulation for Preparation 15:

|  | Percent of total solution |
| --- | --- |
| Guar Gum | 0.015% |
| Gum Arabic | 0.025% |
| Glycerin | 30% |
| Aloe Vera | 0.010% |
| Potassium Sorbate | 0.1% |
| Ascorbic Acid | 1% |
| Citric Acid | 0.1% |
| Tocopherol | 0.01% |
| Water | 0.31% |

The components of Preparation 15 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 15 showed notable results when compared to a conventional, prior art preparation. The production rate increased at the facility from 6 tons/hour to 8.3 tons/hour with a higher operating temperature in the chamber, which increased from 185° F. (85° C.) to 200° F. (93.3° C.). Additionally, the operational amperage decreased from 180 Amps to 168 Amps. The life of the roll was increased by decreasing the roller operational pounds per square inch (PSI) from 275 PSI to 230 PSI, thereby increasing the roller life from 10 months to 14 months with a 30% reduction in fines. Further, lower decibels were experienced during production.

EXAMPLE XVI

An animal feed flake product was prepared with an organic-based ingredient and a lubricant and binding agent that was prepared according to the following formulation for Preparation 16:

|  | Percent of total solution |
| --- | --- |
| Guar Gum | 0.015% |
| Gum Arabic | 0.025% |
| Glycerin | 30% |
| Aloe Vera | 0.010% |
| Potassium Sorbate | 0.1% |
| Ascorbic Acid | 1% |
| Citric Acid | 0.1% |
| Tocopherol | 0.01% |
| Water | 68.74% |

The components of Preparation 16 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 16 showed notable results when compared to a conventional, prior art preparation. The production rate increased at the facility from 2 tons/hour to 5 tons/hour with a higher operating temperature in the conditioning chamber, which increased from 152° F. (66.6° C.) to 192° F. (88.8° C.). Additionally, the operational amperage decreased from 120 Amps to 95 Amps and the Pellet Durability Index (PDI) increased from 89 to 93. These benefits resulted in an increased life of dyes and shells from 4,000 tons produced to over 4,800 tons produced. Further, lower decibels were experienced during production.

EXAMPLE XVII

An animal feed pellet product was prepared with an organic-based ingredient and a lubricant and binding agent that was prepared according to the following formulation for Preparation 17:

|  | Percent of total solution |
| --- | --- |
| Guar Gum | 0.015% |
| Gum Arabic | 0.025% |
| Glycerin | 30% |
| Aloe Vera | 0.010% |
| Potassium Sorbate | 0.1% |
| Ascorbic Acid | 1% |
| Citric Acid | 0.1% |
| Tocopherol | 0.01% |
| Water | 68.74% |

The components of Preparation 17 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 17 showed notable results when compared to a conventional, prior art preparation. The production rate increased at the facility from 4 tons/hour to 7 tons/hour with a higher operating temperature in the chamber, which increased from 154° F. (67.7° C.) to 187° F. (86.1° C.). Additionally, the operational amperage decreased from 125 Amps to 95 Amps and the Pellet Durability Index (PDI) increased from 91 to 97. These benefits resulted in an increased life of dyes and shells from 8,000 tons produced to over 10,000 tons produced. Further, lower decibels were experienced during production.

EXAMPLE XVIII

An animal feed pellet product was prepared with an organic-based ingredient and a lubricant and binding agent that was prepared according to the following formulation for Preparation 18:

|  | Percent of total solution |
| --- | --- |
| Guar Gum | 0.017% |
| Gum Arabic | 0.028% |
| Glycerin | 36% |
| Aloe Vera | 0.016% |
| Potassium Sorbate | 0.12% |
| Ascorbic Acid | 1.5% |
| Citric Acid | .15% |
| Tocopherol | .012% |
| H2O | 62.157% | the components of Preparation 18 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 18 showed notable results when compared to a conventional, prior art preparation. The production rate increased at the facility from 2 tons/hour to 5 tons/hour with a higher operating temperature in the chamber, which increased from 157° F. (69.4° C.) to 198° F. (92.2° C.). Additionally, the operational amperage decreased from 120 Amps to 95 Amps and the Pellet Durability Index (PDI) increased from 86 to 93. These benefits resulted in an increased life of dyes and shells from 3,000 tons produced to over 4,100 tons produced. Further, lower decibels were experienced during production.

EXAMPLE XIX

An animal feed pellet product was prepared with an organic-based ingredient and a lubricant and binding agent that was prepared according to the following formulation for Preparation 19:

|  | Percent of total solution |
| --- | --- |
| Guar Gum | 0.009% |
| Gum Arabic | 0.018% |
| Glycerin | 28% |
| Aloe Vera | 0.009% |
| Potassium Sorbate | 0.1% |
| Ascorbic Acid | 1% |
| Citric Acid | 0.1% |
| Tocopherol | 0.01% |
| Water | 70.754% |

The components of Preparation 19 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 19 showed notable results when compared to a conventional, prior art preparation. The production rate increased at the facility from 4 tons/hour to 8 tons/hour with a higher operating temperature in the chamber, which increased from 148° F. (64.4° C.) to 183° F. (83.8° C.). Additionally, the operational amperage decreased from 125 Amps to 105 Amps and the Pellet Durability Index (PDI) increased from 88 to 96. These benefits resulted in an increased life of dyes and shells from 4,000 tons produced to over 5,000 tons produced. Further, lower decibels were experienced during production.

EXAMPLE XX

An animal feed pellet product was prepared with an organic-based ingredient and a lubricant and binding agent that was prepared according to the following formulation for Preparation 20:

|  | Percent of total solution |
| --- | --- |
| Guar Gum | 0.017% |
| Gum Arabic | 0.028% |
| Glycerin | 34% |
| Aloe Vera | 0.017% |
| Potassium Sorbate | 0.12% |
| Ascorbic Acid | 1% |
| Citric Acid | 0.1% |
| Tocopherol | 0.01% |
| Water | 64.708% |

The components of Preparation 20 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F.

(29.4° C.). The composition was mixed well till the consistency was a viscous liquid with no visible solid particles.

With respect to an animal feed flake product, Preparation 20 showed notable results when compared to a conventional, prior art preparation. The production rate increased at the facility from 4 tons/hour to 6 tons/hour with a higher operating temperature in the chamber, which increased from 160° F. (71.1° C.) to 189° F. (87.2° C.). Additionally, the operational amperage decreased from 140 Amps to 105 Amps and the Pellet Durability Index (PDI) increased from 82 to 92. These benefits resulted in an increased life of dyes and shells from 6,000 tons produced to over 7,300 tons produced. Further, lower decibels were experienced during production.

EXAMPLE XXI

An animal feed pellet product was prepared with an organic-based ingredient and a lubricant and binding agent that was prepared according to the following formulation for Preparation 21:

|  | Percent of total solution |
| --- | --- |
| Guar Gum | 0.009% |
| Gum Arabic | 0.018% |
| Glycerin | 28% |
| Aloe Vera | 0.009% |
| Potassium Sorbate | 0.1% |
| Ascorbic Acid | 1% |
| Citric Acid | 0.1% |
| Tocopherol | 0.01% |
| H2O | 70.754% |

The components of Preparation 21 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 21 showed notable results when compared to a conventional, prior art preparation. The production rate increased at the facility from 4 tons/hour to 6 tons/hour with a higher operating temperature in the chamber, which increased from 160° F. (71.1° C.) to 189° F. (87.2° C.). Additionally, the operational amperage decreased from 140 Amps to 105 Amps and the Pellet Durability Index (PDI) increased from 84 to 92. These benefits resulted in an increased life of dyes and shells from 6,000 tons produced to over 7,300 tons produced. Further, lower decibels were experienced during production.

With respect to this particular implementation, the use of Preparation 21 resulted in significant cost savings per pound, a higher production rate, a higher conditioning chamber temperature. Additional benefits included a significantly lower inclusion rate, longer dye and shell life, reduction in required storage space and elimination of airborne particular matter.

EXAMPLE XXII

An animal feed pellet product was prepared with an organic-based ingredient and a lubricant and binding agent that was prepared according to the following formulation for Preparation 22:

|  | Percent of total solution |
| --- | --- |
| Guar Gum | 0.016% |
| Gum Arabic | 0.027% |
| Glycerin | 32% |
| Aloe Vera | 0.012% |
| Potassium Sorbate | 0.1% |
| Ascorbic Acid | 1% |
| Citric Acid | 0.1% |
| Tocopherol | 0.01% |
| Water | 66.735% |

The components of Preparation 22 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to an animal feed flake product, Preparation 22 showed notable results when compared to a conventional, prior art preparation. The production rate increased at the facility from 4 tons/hour to 6 tons/hour with a higher operating temperature in the chamber, which increased from 160° F. (71.1° C.) to 185° F. (85° C.). Additionally, the operational amperage decreased from 140 Amps to 90 Amps and the Pellet Durability Index (PDI) increased from 78 to 87. These benefits resulted in an increased life of dyes and shells from 6,000 tons produced to over 7,300 tons produced. Further, lower decibels were experienced during production.

EXAMPLE XXIII

A floater fish food product was prepared with an organic-based ingredient and a lubricant and binding agent that was prepared according to the following formulation for Preparation 23:

|  | Percent of total solution |
| --- | --- |
| Guar Gum | 0.010% |
| Gum Arabic | 0.020% |
| Glycerin | 35% |
| Aloe Vera | 0.010% |
| Potassium Sorbate | 0.1% |
| Ascorbic Acid | 1% |
| Citric Acid | 0.1% |
| Tocopherol | 0.01% |
| Water | 63.75% |

The components of Preparation 23 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a floater fish food product, Preparation 23 showed notable results when compared to a conventional, prior art preparation. The production rate increased at the facility from 5.6 tons/hour to 8.2 tons/hour with a higher operating temperature in the chamber, which increased from 178° F. (81.1° C.) to 189° F. (87.2° C.). Additionally, the operational amperage decreased from 155 Amps to 112 Amps. These benefits resulted in an increased life of dyes and shells from 4,000 tons produced to over 4,800 tons produced. Further, lower decibels were experienced during production.

EXAMPLE XXIV

A sinker fish food product was prepared with an organic-based ingredient and a lubricant and binding agent that was prepared according to the following formulation for Preparation 24:

|  | Percent of total solution |
| --- | --- |
| Guar Gum | 0.015% |
| Gum Arabic | 0.025% |
| Glycerin | 30% |
| Aloe Vera | 0.010% |
| Potassium Sorbate | 0.1% |
| Ascorbic Acid | 1% |
| Citric Acid | 0.1% |
| Tocopherol | 0.01% |
| H2O | 68.74% |

The components of Preparation 24 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a floater fish food product, Preparation 24 showed notable results when compared to a conventional, prior art preparation. The production rate increased at the facility from 5.6 tons/hour to 8.2 tons/hour with a higher operating temperature in the chamber, which increased from 178° F. (81.1° C.) to 189° F. (87.2° C.). Additionally, the operational amperage decreased from 155 Amps to 112 Amps. These benefits resulted in an increased life of dyes and shells from 4,000 tons produced to over 4,800 tons produced. Further, lower decibels were experienced during production.

EXAMPLE XXV

A pellet pet food product was prepared with an organic-based ingredient and a lubricant and binding agent that was prepared according to the following formulation for Preparation 25:

|  | Percent of total solution |
| --- | --- |
| Guar Gum | 0.01% |
| Gum Arabic | 0.02% |
| Glycerin | 30% |
| Aloe Vera | 0.01% |
| Potassium Sorbate | 0.1% |
| Ascorbic Acid | 1% |
| Citric Acid | 0.1% |
| Tocopherol | 0.01% |
| Water | 68.75% |

The components of Preparation 25 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a pellet pet food product, Preparation 25 showed notable results when compared to a conventional, prior art preparation. The production rate increased at the facility from 4 tons/hour to 4.75 tons/hour.

EXAMPLE XXVI

A pellet pet food product was prepared with an organic-based ingredient and a lubricant and binding agent that was prepared according to the following formulation for Preparation 26:

|  | Percent of total solution |
| --- | --- |
| Guar Gum | 0.016% |
| Gum Arabic | 0.028% |
| Glycerin | 30% |
| Aloe Vera | 0.014% |
| Potassium Sorbate | 0.1% |
| Ascorbic Acid | 1% |
| Citric Acid | 0.1% |
| Tocopherol | 0.01% |
| Water | 68.732% |

The components of Preparation 26 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a pellet pet food product, Preparation 26 showed notable results when compared to a conventional, prior art preparation. The production rate increased at the facility from 4 tons/hour to 4.75 tons/hour. In this example the down flow (cooling system) was the limiting factor on the production rate.

EXAMPLE XXVII

A wood pellet product was prepared with an organic-based ingredient and a lubricant and binding agent that was prepared according to the following formulation for Preparation 27:

|  | Percent of total solution |
|---|---|
| Guar Gum | 0.008% |
| Gum Arabic | 0.016% |
| Glycerin | 33% |
| Aloe Vera | 0.008% |
| Potassium Sorbate | 0.8% |
| Ascorbic Acid | 0.75% |
| Citric Acid | 0.075% |
| Tocopherol | 0.008% |
| Water | 65.335% |

The components of Preparation 27 were mixed together and sufficiently heated to obtain a fluid. The resulting binding agent was utilized in a pellet-mill production, steam-based process of the type described in FIG. 1 with the following modifications. A high shearing method was utilized to mix Aloe Vera, Guar Gum, Gum Arabic, Ascorbic and Citric Acid, Potassium Sorbate and Tocopherol in warm [about 80° F. (26.6° C.)] ½ required quantity of water till there are no lumps remaining and fully dissolved in the mix. Then, glycerin and another ½ of the required quantity of heated water was added at a temperature of about 85° F. (29.4° C.). The composition was mixed well till the consistency was a viscous liquid with no visible solid particles.

With respect to a wood pellet product, Preparation 27 showed notable results when compared to a conventional, prior art preparation. The production rate increased at the facility from 2.5 tons/hour to 5.1 tons/hour with a higher operating temperature in the chamber, which increased from 120° F. (48.8° C.) to 190° F. (87.7° C.). Additionally, the operational amperage decreased from 175 Amps to 145 Amps. Further, lower decibels were experienced during production.

In use, the lubricant and binding agent saves 15% to 50% on electricity depending on the mill type. Additionally, the lubricant and binding agent increases the temperature by at least 20 degrees Fahrenheit, which helps breakdown starches into sugars quicker and kill any bacteria present. The mill, also, may be optimized to produce 15% to 40% more tonnage due to the lubricant properties of the lubricant and binding agent. Additionally, the use of the lubricant and binding agent keeps "fines" to a minimum, which is a tremendous savings.

As a result, mill parts may last easily 20% to 30% longer. This saves significant money. Additionally the product produced by the systems and methods presented herein using the lubricant and binding agent is a pellet which is much stronger. That is, utilizing the teachings presented herein, benefits may be obtained, including increased production rate, lower amperage per ton, same bushel weight with reduced PSI on rolls, higher starch and sugar availability, increased flake diameter, and higher utilization of raw ingredients.

With respect to Examples I through XXVII, the selection of equipment, outside ambient temperature, inside ambient temperate, and outside humidity may also impact production. Production may also be impacted by the type of pellet mill, elevator, cooler, structure, loadout elevator, watering pump, tubing, and steel quill, for example. As a specific example, if one utilizes an industrial high shearing mixer, there will be change in some of the steps of the preparation and an increase in production capacity. It should be appreciated that regardless of the environmental conditions and equipment specifications, the lubricant and binding agent presented herein improves production.

The order of execution or performance of the methods and processes illustrated and described herein is not essential, unless otherwise specified. That is, elements of the methods and processes may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for the production of an organic-based pellet, the method comprising:
   providing an organic-based ingredient;
   incorporating a lubricant and binding agent with the organic-based ingredient, the lubricant and binding agent including:
      about 15% to about 40% by weight of glycerin,
      about 0.005% to about 0.017% by weight of guar gum,
      about 0.009% to about 0.028% by weight of gum arabic,
      about 0.005% to about 0.017% by weight of aloe vera, and
      a balance by weight of water; and
   subjecting the organic-based ingredient and the lubricant and binding agent to a pellet-mill production process.

2. The method as recited in claim 1, wherein incorporating the lubricant and binding agent with the organic-based ingredient, further comprises incorporating the lubricant and binding agent including:
   about 0.06% to about 0.18% by weight of potassium sorbate;
   about 0.55% to about 2% by weight of ascorbic acid;
   about 0.055% to about 0.2% by weight of citric acid; and
   about 0.0055% to about 0.018% by weight of tocopherol.

3. The method as recited in claim 1, wherein incorporating the lubricant and binding agent with the organic-based ingredient, further comprises incorporating the lubricant and binding agent including up to about 35% by weight of glycerin.

4. The method as recited in claim 1, wherein incorporating the lubricant and binding agent with the organic-based ingredient, further comprises incorporating the lubricant and binding agent including between about 0.06% to about 0.18% by weight of potassium sorbate.

5. The method as recited in claim 1, wherein incorporating the lubricant and binding agent with the organic-based ingredient, further comprises incorporating the lubricant and binding agent including between about 0.55% to about 2% by weight of ascorbic acid.

6. The method as recited in claim 1, wherein incorporating the lubricant and binding agent with the organic-based ingredient, further comprises incorporating the lubricant and binding agent including between about 0.055% to about 0.2% by weight of citric acid.

7. The method as recited in claim 1, wherein incorporating the lubricant and binding agent with the organic-based ingredient, further comprises incorporating the lubricant and binding agent including between about 0.0055% to about 0.018% by weight of tocopherol.

8. The method as recited in claim 1, wherein providing the organic-based ingredient further comprises providing an ingredient selected from the group consisting of animal feed stock, feed, fish food, wood, wood charcoal, fertilizer, and construction material.

9. The method as recited in claim 1, wherein subjecting the organic-based ingredient and the lubricant and binding agent to a pellet-mill production process further comprises subjecting the organic-based ingredient to a steam-based process.

10. A system for the production of an organic-based pellet, the system comprising:
   pellet-mill production equipment configured to receive an organic-based ingredient and a lubricant and binding agent to produce the organic-based pellet; and
   the lubricant and binding agent including:
      about 15% to about 40% by weight of glycerin,
      about 0.005% to about 0.017% by weight of guar gum,
      about 0.009% to about 0.028% by weight of gum arabic,
      about 0.005% to about 0.017% by weight of aloe vera, and
      a balance by weight of water.

11. The system as recited in claim 10, wherein the lubricant and binding agent further include:
   about 0.06% to about 0.18% by weight of potassium sorbate;
   about 0.55% to about 2% by weight of ascorbic acid;
   about 0.055% to about 0.2% by weight of citric acid; and
   about 0.0055% to about 0.018% by weight of tocopherol.

12. The system as recited in claim 10, wherein the lubricant and binding agent further comprises up to about 35% by weight of glycerin.

13. The system as recited in claim 10, wherein incorporating the lubricant and binding agent with the organic-based ingredient, further comprises incorporating the lubricant and binding agent including between about 0.06% to about 0.18% by weight of potassium sorbate.

14. The system as recited in claim 10, wherein incorporating the lubricant and binding agent with the organic-based ingredient, further comprises incorporating the lubricant and binding agent including between about 0.55% to about 2% by weight of ascorbic acid.

15. The system as recited in claim 10, wherein incorporating the lubricant and binding agent with the organic-based ingredient, further comprises incorporating the lubricant and binding agent including between about 0.055% to about 0.2% by weight of citric acid.

16. The system as recited in claim 10, wherein incorporating the lubricant and binding agent with the organic-based ingredient, further comprises incorporating the lubricant and binding agent including between about 0.0055% to about 0.018% by weight of tocopherol.

17. The system as recited in claim 10, wherein providing the organic-based ingredient further comprises providing an ingredient selected from the group consisting of animal feed stock, feed, fish food, wood, wood charcoal, fertilizer, and construction material.

18. The system as recited in claim 10, wherein the pellet-mill production equipment further comprises steam-based pellet-mill production equipment.

19. A lubricant and binding agent for the production of an organic-based pellet, the lubricant and binding agent comprising:
   about 15% to about 40% by weight of glycerin;
   about 0.005% to about 0.017% by weight of guar gum;
   about 0.009% to about 0.028% by weight of gum arabic;
   about 0.005% to about 0.017% by weight of aloe vera; and
   a balance by weight of water.

20. The lubricant and binding agent as recited in claim 19, further comprising:
   about 0.06% to about 0.18% by weight of potassium sorbate;
   about 0.55% to about 2% by weight of ascorbic acid;
   about 0.055% to about 0.2% by weight of citric acid; and
   about 0.0055% to about 0.018% by weight of tocopherol.

* * * * *